US011623354B2

(12) United States Patent
Caron L'ecuyer et al.

(10) Patent No.: US 11,623,354 B2
(45) Date of Patent: Apr. 11, 2023

(54) ROBOTIC ARM WITH QUICK-CONNECT CLAMPING SYSTEM AND DOCKING CRADLE

(71) Applicant: KINOVA INC., Boisbriand (CA)

(72) Inventors: Louis-Joseph Caron L'ecuyer, Blainville (CA); Jean-Francois Forget, Boisbriand (CA); Louis-Pierre Fortin, Boisbriand (CA); Sylvain Poulin, Boisbriand (CA)

(73) Assignee: KINOVA INC., Boisbriand (CA)

( * ) Notice: Subject to any disclaimer, the term of this patent is extended or adjusted under 35 U.S.C. 154(b) by 720 days.

(21) Appl. No.: 16/570,099

(22) Filed: Sep. 13, 2019

(65) Prior Publication Data

US 2020/0086504 A1    Mar. 19, 2020

Related U.S. Application Data

(60) Provisional application No. 62/730,643, filed on Sep. 13, 2018.

(51) Int. Cl.
*B25J 9/00* (2006.01)
*B25J 15/04* (2006.01)
*B25J 19/00* (2006.01)
*B25J 17/02* (2006.01)
*F16B 2/18* (2006.01)
*F16B 2/06* (2006.01)

(52) U.S. Cl.
CPC ......... *B25J 15/0425* (2013.01); *B25J 9/0009* (2013.01); *B25J 17/02* (2013.01); *B25J 19/0029* (2013.01); *F16B 2/06* (2013.01); *F16B 2/18* (2013.01)

(58) Field of Classification Search
CPC .... B25J 15/0425; B25J 15/0408; B25J 9/162; B25J 9/009
See application file for complete search history.

(56) References Cited

U.S. PATENT DOCUMENTS

| 8,702,341 | B2 * | 4/2014 | Ravindran | ............... B25J 15/04 403/376 |
|---|---|---|---|---|
| 9,346,160 | B2 * | 5/2016 | Edsinger | ................. B25J 9/0096 |
| 10,099,371 | B2 * | 10/2018 | Cookson | ..................... B25J 9/08 |
| 11,167,411 | B2 * | 11/2021 | Toothaker | ............ B25J 15/0491 |
| 2020/0328051 | A1 * | 10/2020 | Treger | ................. H01H 19/005 |
| 2020/0346347 | A1 * | 11/2020 | San | ......................... B25J 9/1633 |

FOREIGN PATENT DOCUMENTS

| WO | WO-2017098707 A1 * | 6/2017 | ............. A61B 34/35 |
|---|---|---|---|
| WO | WO-2018230517 A1 * | 12/2018 | ............... B25J 13/08 |
| WO | WO-2019087821 A  * | 5/2019 | ........... B23Q 3/1554 |

* cited by examiner

*Primary Examiner* — Randell J Krug
(74) *Attorney, Agent, or Firm* — Norton Rose Fulbright Canada LLP

(57) ABSTRACT

A system comprising an articulated robot arm including assembly of links interconnected with motorized joint units at joints between the links for movements of the links relative to one another, one of the links being a base link. A docking cradle is adapted to be connected to a structure and configured for being releasably connected and for supporting the articulated robot arm. A coupling configuration is between the base link and the docking cradle for powering contact to be made. A clamping system includes one or more clamp members and a clamp lever for locking the base link to the docking cradle at the coupling configuration.

18 Claims, 9 Drawing Sheets

ROBOTIC ARM WITH QUICK-CONNECT CLAMPING SYSTEM AND DOCKING CRADLE

CROSS-REFERENCE TO RELATED APPLICATION

The present application claims the priority of U.S. Patent Application No. 62/730,643, filed on Sep. 13, 2018 and incorporated herein by reference.

TECHNICAL FIELD

The present application relates to the field of robotics, such as robot arms that are part of collaborative robots, also called lightweight robots, commonly used in the manufacturing industry, and to assistive robots.

BACKGROUND OF THE ART

Robotic arms are increasingly used in a number of different applications, from manufacturing, to servicing, and assistive robotics, among numerous possibilities. Serial robot arms are convenient in that they cover wide working volumes. For example, collaborative robot arms, also known as lightweight robot arms, have been used in some industrial applications, such as on plant floors. Compared to some industrial counterparts who were quite heavy and had to be fenced for safety reasons, collaborative robot arms are lighter, smaller and can operate alongside humans with lesser risk. The collaborative robot arms may still apply some of the same principles as traditional industrial robots have: They are attached to a worktable, bolted on the shop floor, etc.

A particular feature of some collaborative robot arms is the capacity of the latter to be moved from one workstation to another depending of the production requirements. In order to do so, plant personnel may often have to unplug the robot arm, detach it from a supporting structure and/or unplug a robot controller, to then do a reverse of some or all of these steps to install the robot arm at another location. During the installation, calibration and setup steps may then often be required before the robot arm can be operated again. The process of moving a robot arm may be time consuming, and may employ specialized personnel notably for the calibration and setup.

To simplify this task, some robot arm manufacturers offer their arm on a wheeled platform. In this case, moving a robot arm from one location to another along with its controller is easier, though some specialized personnel may be needed to unplug and replug various cables (power, communication, control).

SUMMARY

It is an aim of the present disclosure to provide a robot arm that addresses issues related to the prior art.

Therefore, in accordance with an embodiment of the present disclosure, there is provided a system comprising: an articulated robot arm including assembly of links interconnected with motorized joint units at joints between the links for movements of the links relative to one another, one of the links being a base link; at least one docking cradle adapted to be connected to a structure and configured for being releasably connected and for supporting the articulated robot arm; a coupling configuration between the base link and the docking cradle for powering contact to be made; and a clamping system including at least one clamp member and a clamp lever for locking the base link to the docking cradle at the coupling configuration.

In accordance with another embodiment, there is provided an assembly comprising: a docking cradle adapted to be connected to a structure; a base link of an articulated robot arm adapted to be releasably mounted to the docking cradle; a male and female coupling configuration between the base link and the docking cradle for powering contact to be made; and a clamping system including at least one clamp member and a clamp lever for locking the base link to the docking cradle at the male and female coupling configuration.

In accordance with yet another embodiment, there is provided a system comprising: an articulated robot arm including assembly of links interconnected with motorized joint units at joints between the links for movements of the links relative to one another, one of the links being a base link; a docking cradle adapted to be connected to a structure and configured for being supporting the articulated robot arm; a male and female coupling configuration between the base link and the docking cradle for powering contact to be made; and a clamping system including at least one clamp member and a clamp lever for locking the base link to the docking cradle at the male and female coupling configuration.

DETAILED DESCRIPTION

Figure 1:
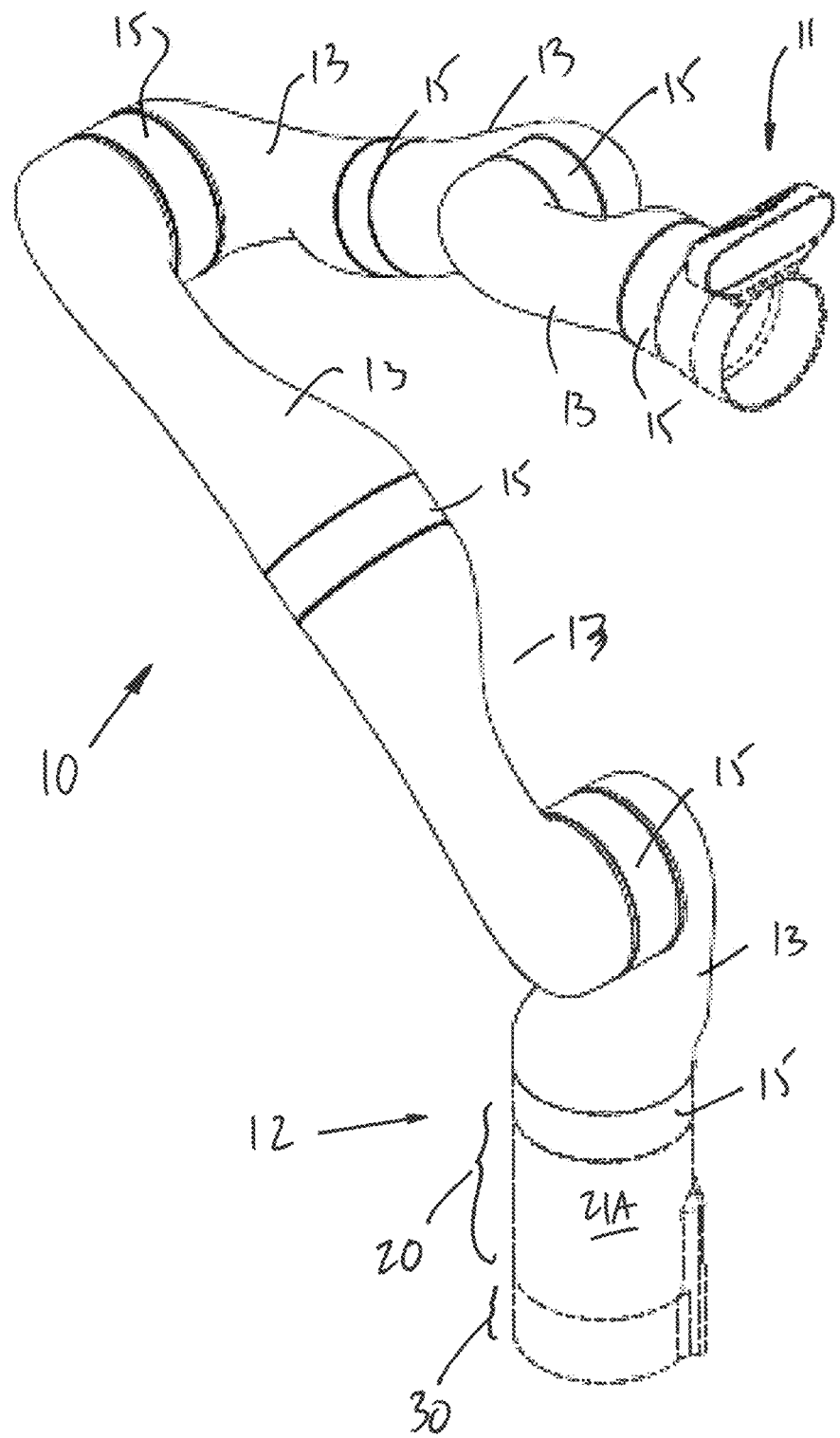
FIG. 1 is an isometric view of an articulated robot arm with quick-connect clamping system in accordance with an embodiment of the present disclosure.

Referring to the drawings and more particularly to FIG. 1, a mechanism such as a robot arm in accordance with the present disclosure is generally shown at 10. The robot arm 10 may be known as a robot, an articulated mechanism, a serial mechanism, among other names. The robot arm 10 may be a collaborative robot arm, an industrial robot arm, an assistive robot arm, among other possibilities, with the robot arm 10 being devised for a variety of uses. For simplicity, the expression "robot arm" is used throughout, but in a non-limiting manner. The robot arm 10 is a serial articulated robot arm, having an effector end 11 and a base end 12. The effector end 11 is configured to receive any appropriate tool, such as gripping mechanism or gripper, anomorphic hand, and tooling heads such as drills, saws, etc. The end effector secured to the effector end 11 is as a function of the contemplated use. However, the robot arm 10 is shown without any such tool in FIG. 1, and ready for supporting a tool. The base end 12 is configured to be connected to any appropriate structure or mechanism. The base end 12 may be rotatably mounted or not to the structure or mechanism. By way of non-exhaustive example, the base end 12 may be mounted to a wheelchair, to a vehicle, to a frame, to a cart, to a robot docking station. Although a serial robot arm is shown the joint arrangement of the robot arm 10 may be found in other types of robots, included parallel manipulators.

The robot arm 10 has a series of links 13 (also known as shells), interconnected by motorized joint units 14 (one schematically shown in FIG. 2), for example with optional protective sleeves 15 at the junction between adjacent links 13. A bottom one of the links 13 is shown and referred to herein as a robot arm base link 20, or simply base link 20, and is releasably connected to a docking cradle 30 via a quick-connect clamping system 40.

- The links 13 and 20 define the majority of the outer surface of the robot arm 10. The links 13 and 20 also have a structural function in that they form the skeleton of the robot arm 10 (i.e., an outer shell skeleton), by supporting the motorized joint units 14 and tools at the effector end 11, with loads supported by the tools, in addition to supporting the weight of the robot arm 10 itself. Wires and electronic components may be concealed into the links 13 and 20, by internal routing.
- The motorized joint units 14 interconnect adjacent links 13 and 20, in such a way that a rotational degree of actuation is provided between adjacent links 13 and 20. According to an embodiment, the motorized joint units 14 may also connect a link to a tool at the effector end 11, although other mechanisms may be used at the effector end 11 and at the base end 12. The motorized joint units 14 may also form part of structure of the robot arm 10, as they interconnect adjacent links 13 and 20.
- The sleeves 15 shield the junction between pairs of adjacent links 13 and 20. The sleeves 15 may form a continuous fastener-less surface from one link 13, 20 to another.
- The base link 20 is at the base of the robot arm 10 and, in addition to its structural function, is tasked for releasably connecting the robot arm 10 to the docking cradle 30.
- The docking cradle 30 is part of the structure or mechanism to which the robot arm 10 is to be releasably connected. For example, the docking cradle 30 may be on a workstation, bench, table, wheeled support, floor, etc. The docking cradle 30 may have other names, such as robot arm base, dock, anchor, docking station, etc. For simplicity, the expression docking cradle will be used herein. The base link 20 of one robot arm 10 may be used with numerous docking cradles 30, when the robot arm 10 is transferred from one location to another. Likewise, the base links 20 of multiple robot arms 10 may be used with one or more docking cradle 30, for instance, by interchanging robot arms 10 on a docking cradle 30 as a function of the tools supported by the robot arms 10.
- The clamping system 40 is used to lock the base link 20 to the docking cradle 30 when they are coupled to one another. The clamping system 40 may assist in the accurate alignment of the base link 20 and docking cradle 30. The expression quick-connect is used with reference to the clamping system 40 as it enables the connection of the base link 20 to the docking cradle 30 without additional tools, whereby the connection is quick in comparison to robot arms that require tools for their connection/disconnection. However, the "expression" quick is not tied to any specific time duration, as it is merely used as a common moniker for coupling of components without tools.

Figure 2:
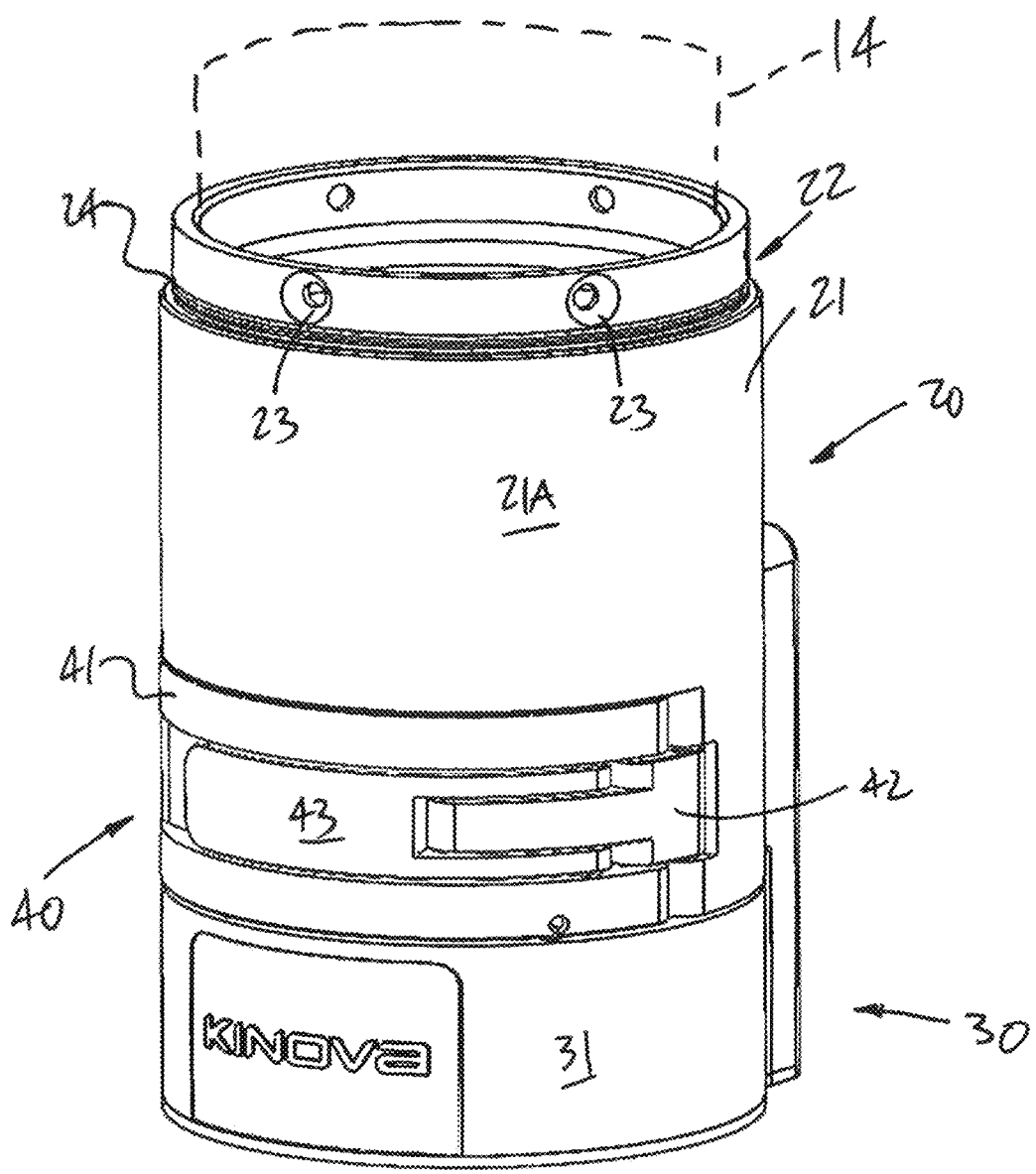
FIG. 2 is an isometric view of a base link of the robot arm of FIG. 1 installed on a docking cradle, in accordance with the present disclosure, with a clamping system locking the assembly in place.

Referring to FIG. 2, the link 20 is shown in greater detail, and has features similar to the other links 13. The expression "link" is used herein to describe a rigid member, without in and of itself any degree of freedom between its ends. A link may be connected to another link by a joint, such as one of the motorized joint units 14. However, as the present disclosure pertains to a connection of the base link 20 with the docking cradle 30, only the base link 20 is described in further detail herein. The link 20 has a tubular body 21. An outer peripheral surface 21A of the tubular body 21 forms the exposed surface of link. The tubular body 21 may differ in length, in diametrical dimension, and in shape in comparison to the tubular bodies of the links 13. For example, as shown in FIG. 1, some of the base link 20 and some of the links 13 may be generally straight or angled, i.e., arranged such that the rotation angles of the motorized joint units 14 at their opposed ends are parallel, perpendicular, or at any other angle. Some links 13 and 20 may be longer, etc. Also, the open ends of the links 13 and 20 may have the same diameter for all motorized joint units 14 to be the same size, it is contemplated to scale down the motorized joint units 14 from the proximal base end 12 to the distal effector end 11 to reduce the overall weight of the robot arm 10. In such a case, the diameter of the open ends of the links 13 may incrementally reduce toward the distal end. The tubular body 21 of the base link 20 and of the links 13 may consist of any appropriate material, including composites, plastics, metals, or any combination thereof. The tubular body 21 may be monolithic pieces, or an assembly of components, and may be molded, extruded, machined, etc.

The top open end of the tubular body 21 may have a connector 22. Other arrangements are possible as well, including the absence of such a connector 22 in the base link 20, although the connector 22 is shown in such location in FIG. 1. The connector 22 may be an integral part of the tubular body 21, e.g., monoblock, or may be an added ring, for example. The connector 22 may be annular in shape, with a circular section. The connector 22 may form a neck from the main outer peripheral surface 21A of the tubular body 21. Stated differently, a step is present from the main outer peripheral surface 21A to the connector 22, due to a larger diameter of the tubular bodies 21 at the main outer peripheral surface 21A immediately adjacent to the connector 22, for receiving the protective sleeve 15 thereon. The connector 22 may have circumferentially distributed holes 23, such as counterbored holes and/or countersink holes, for receiving fasteners (e.g., bolts, screws, etc) to fasten the motorized joint unit 15 to the base link 20. The holes 23 may be equidistantly spaced, or have a particular sequence, etc.

An annular channel 24 may be defined in the connector 22. The annular channel 24 is devised to receive therein an annular seal, or part of the protective sleeve 15. There may be no annular channel 24, or more than one. The annular seal, if any, may be any appropriate type of seal, such as O-ring, X-shaped ring, square-section ring, to seal an annular junction between the connector 22 and the sleeve 15. The annular seal, if any, is made of an elastomer selected as a function of the contemplated use of the robot arm 10. For example, the selection of the annular seal may depend on the temperatures to which the robot arm 10 will be subjected, the fluids that may contact the robot arm 10, etc. The base link 20 is shown installed on the docking cradle 30, with the clamping system 40 locking them to one another.

Figure 3:
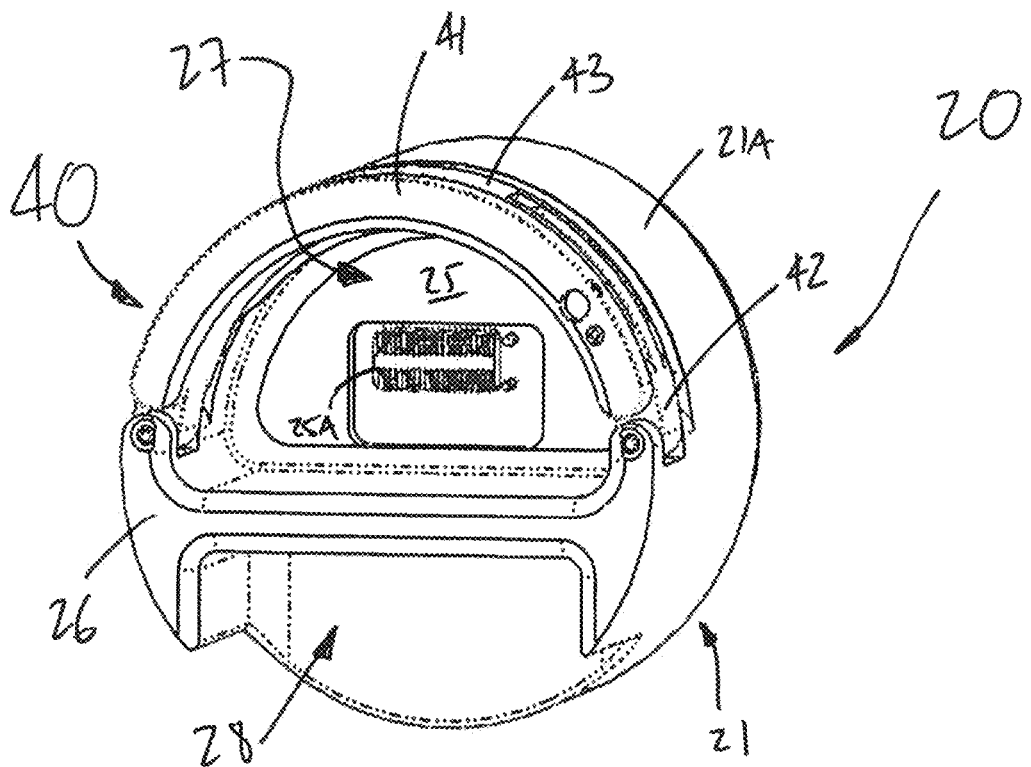
FIG. 3 is an isometric underside view of the robot arm base link of FIG. 2.

Referring to FIG. 3, an underside of the base link 20 is shown. A connection interface 25A is located on a surface 25 of the base link 20. The connection interface may be coupled to wires/cables inside the base link 20 and connects to a complementary interface on the docking cradle 30 as detailed after, the complementary interface providing power to the robot arm 10. The interface 25A may have any appropriate configuration, with one described in further detail hereinafter with reference to FIG. 12.

A wall 26 projects downwardly from the surface 25, and may have a H-shape, although numerous other shapes are considered (e.g., straight rectangular wall, arcuate features, C-shape, etc). The wall 26 may be used to support the clamping system 40 as shown. The wall 26 may also act as a part of a female connector, by defining a cavity 27 with the surface 25 and with the clamping system 40. The cavity 27 may be generally semi-circular as in FIG. 3, and is consequently shaped to orient the robot arm base link 20 on the docking cradle 30 in a unique orientation, i.e., it cannot be properly connected in any other orientation. When robot arm base link 20 is clamped on the docking cradle 30, the surface 25 may or may not sit on the docking cradle 30. The base link 20 may further define a clearance 28 by the surface 25 and the wall 26, though on the other side of the cavity 27. The clearance 28 opens laterally into the outer peripheral surface 21A of the base link 20. However, this is one of numerous contemplated embodiments, as the clearance 28 could be laterally closed off by the extension of the outer peripheral surface 21A. The cavity 27 and the clearance 28 may be different in size and/or shape, so as not to be symmetrical, and hence preserve the concept of unique orientation. The clearance 28, if present, may be used to strengthen the connection between the base link 20 and the docking cradle 30, as explained below. Consequently, by way of cavity 27 and the clearance 28, the base link 20 has two female-like receiving volumes, for mating engagement with the docking cradle 30. The base link 20 could alternatively have a single female-like receiving volume, or more than two. It is also contemplated to provide the female-like receiving volume on the docking cradle 30. Moreover, as seen below, the wall 26 penetrates a slot in the docking cradle 30, whereby the base link 20 could be understood to contribute a male-like connector to the assembly of the base link 20 and the docking cradle 30.

Figure 4:
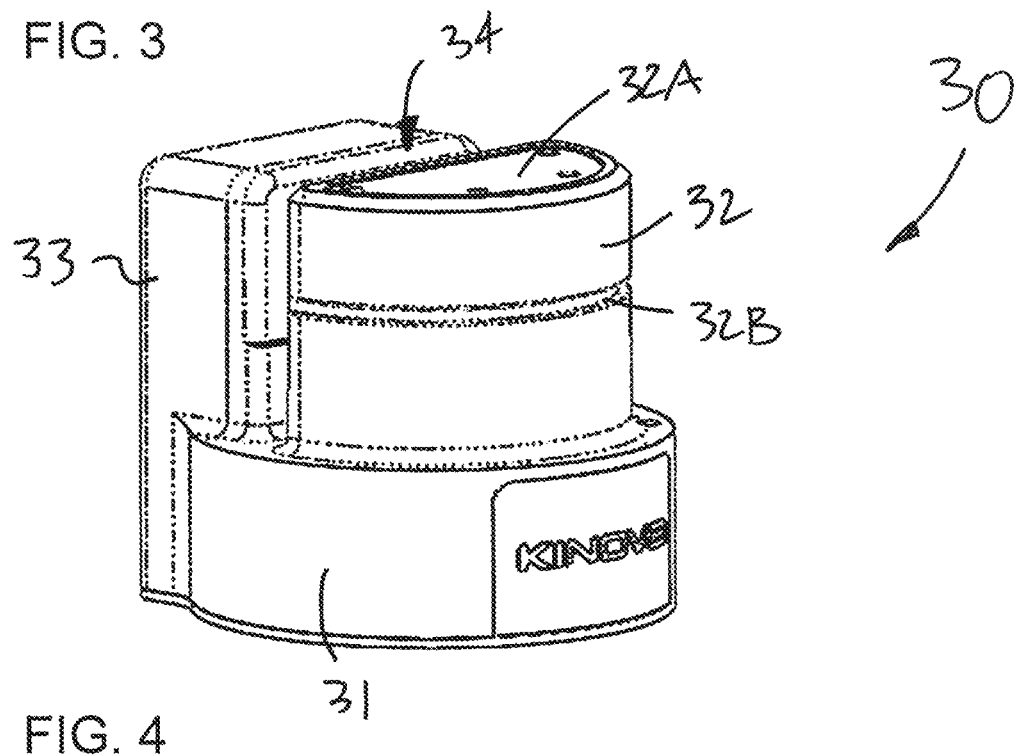
FIG. 4 is an isometric view of the docking cradle of FIG. 2.

Referring to FIGS. 2 and 4, the docking cradle 30 may have a base 31 by which the docking cradle 30 is anchored to a ground or structure. By ground or structure, the present disclosure includes any supporting structure (e.g., table), floor, or mechanism that will support the robot arm 20. The base 31 may be integrally, permanently, temporarily part of the ground or structure. A male block 32 projects upwardly from the base 31. The male block 32, shown as having a semi-circular cross-section, is shaped to fit with minimal play in the cavity 27 of base link 20 (FIG. 3). It is noted that male block 32 can have various shapes, such as a rectangle, a triangle, or any other shape that is designed such that the orientation of the robot arm 10 when clamped on the docking cradle 30 is unique. The cavity 27 of the base link 20 will be shaped in complementary fashion to a shape of the male block 32. On the top of the male block 32 is located connection interface 32A which will be aligned with the connection interface 25A in the cavity 27, for electric coupling of the base link 20 with the docking cradle 30 when the robot arm 10 is on its docking cradle 30. The male block 32 may further define a recessed groove 32B in its side surface, the recessed groove 32B assisting in the accurate clamping of the base link 20 with the docking cradle 30 using the clamping system 40. As specified above, the role of both connection interfaces 25A and 32A is to supply robot arm 10 with all the required electricity power to activate its motors (not shown) and also to supply robot arm 10 with the needed communication and controls signals when robot arm 10 is secured on docking cradle 12, though the control signals could be sent wirelessly as well. According to an embodiment, the connection interface 32A may be designed and constructed without any pins or socket counterparts (e.g., as surface electrodes on a printed-circuit board), as pin-socket type connectors can be damaged when such connector assemblies are frequently unplugged and plugged as pins might bend or show wear. Socket type connectors can accumulate dust or other contaminants regularly seen in manufacturing facilities when unprotected to ambient conditions. Consequently, the connection interface 32A may generally be even with its adjacent surface. This may enable the connection interface 32A to resist to dust and contaminants. The only maintenance that might be required is gently wiping the surface of the connection interface 32A periodically. In another embodiment, the connection interfaces 25A and 32A use pin-socket pairs.

Referring to FIG. 4, the docking cradle 30 may further comprise another male block 33, also projecting upwardly from the base 31. The male block 33 may have a cross-sectional shape differing from that of the male block 33, so as not to fit in the cavity 27 of the base link 20. This may be another feature forcing a unique orientation of the base link 20 on the docking cradle 30. The clearance 28 of the base link 20 will be shaped in complementary fashion to a shape of the male block 33, with the male block 33 extending laterally outward from the base link 20 in the manner shown in FIG. 2. Other arrangements are possible, with the male block 33 for instance fully encapsulated in the receptacle 28, or contributing to forming a continuous cross section for the assembly of the base link 20 and docking cradle 30. When the male block 33 is in the clearance 28, its top surface may abut against the surface 25 of the base link 20, to add stability to the assembly of the base link 20 and the docking cradle 30.

Referring to FIG. 4, a slot 34 may be located between the male blocks 32 and 33. The slot 34 is devised to receive therein the wall 26 of the base link 20, again contributing to the stability of the assembly of the base link 20 and the docking cradle 30. The slot 34 is dimensioned for close fit with the wall 26.

Referring now to FIGS. 5A to 5D, the clamping system 40 is shown in greater detail. The clamping system 40 is shown as being connected to the base link 20. However, a reverse arrangement is contemplated, in which the docking cradle 30 supports the clamping system 40. In such an arrangement, the docking cradle 30 could define a female-type receptacle or cavity, for a male component of the base link 20, among other possibilities. FIGS. 5A to 5D illustrate steps of a clamping sequence when the robot arm 10 is installed on its docking cradle 30. For clarity, the docking cradle 30 is removed, but would usually be present during the clamping sequence.

Figure 5A:
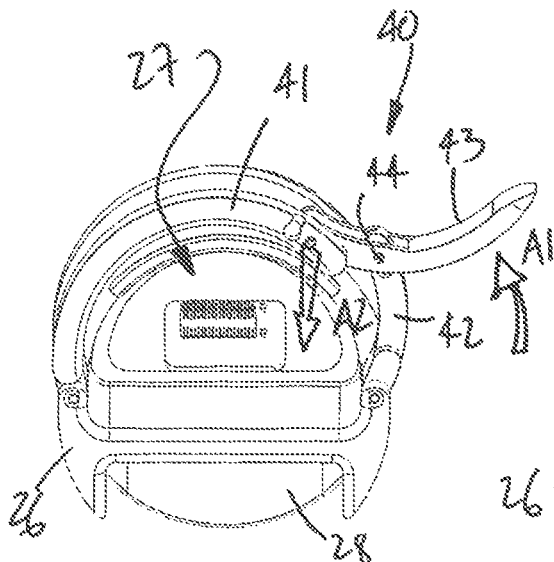
FIGS. 5A to 5D are a sequence of views illustrating steps to close the clamping system once the base link is installed on its docking cradle, but with the docking cradle removed for clarity.
Figure 5B:
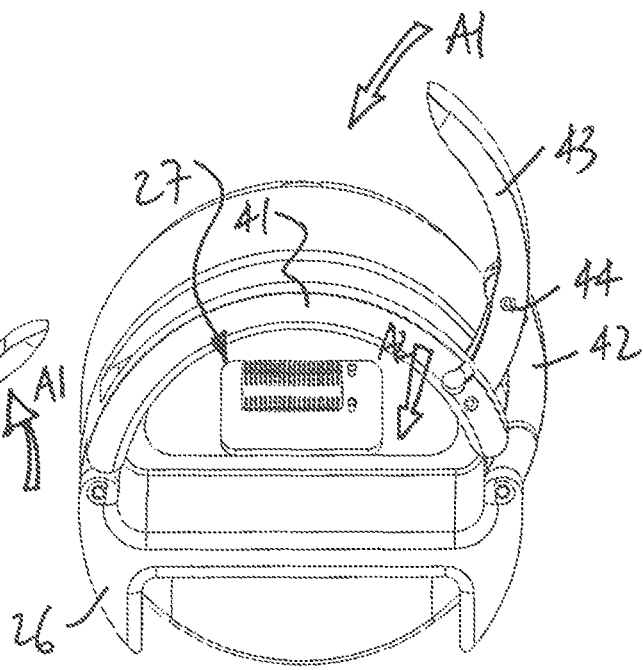
Figure 5C:
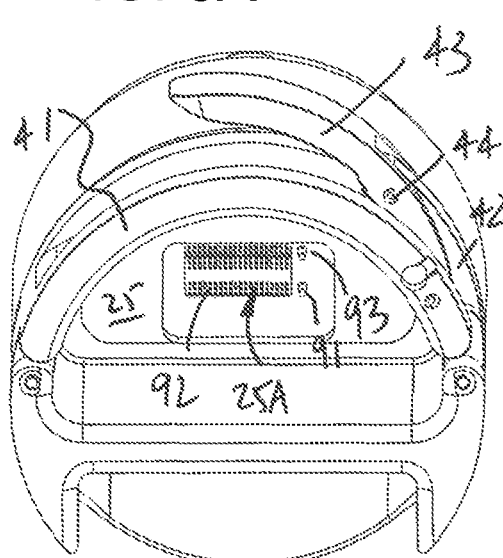

The clamping system 40 has a main clamp member 41 that will apply a locking pressure on the docking cradle 30, by being applied against it. The main clamp member 41 may be pivotally connected to the wall 26. A secondary clamp member 42 may also be pivotally connected to the wall 26, but to an opposite end thereof. The main clamp member 41 and the secondary clamp member 42 concurrently delimit a side wall of the cavity 27. The main clamp member 41 and the secondary clamp member 42 are movable relative to one another, to increase or decrease the size of the cavity 27 and hence lock or release the male block 32 from engagement with the clamping system 40 and base link 20. In an embodiment, a clamp lever 43 is pivotally connected to both the main clamp member 41 and the secondary clamp member 42, and serves to bring the main clamp member 41 and secondary clamp member 42 into engagement with a side wall of the male block 32, as detailed below. The sequence of movements of the clamp lever 43, as shown from FIG. 5A to FIG. 5D, results in the locking configuration of FIG. 5D in which the cavity 27 is at its minimum dimension. In FIG. 5A, the cavity 27 is essentially open, to facilitate the release of the base link 20 from the docking cradle 30.

Figure 5D:
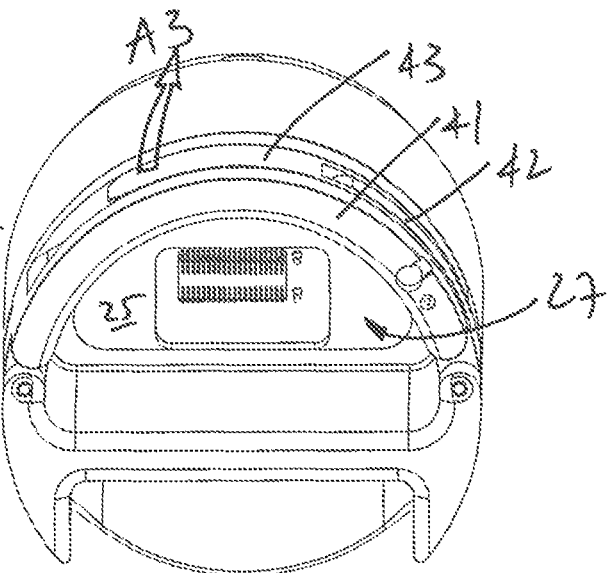

Stated differently, when in the open position, as in FIG. 5A, the clamping system 40 has the main clamp member 41 defining a size for the cavity 27 that is larger than that of the male block 32 in order to be able to position robot arm 10 on the docking cradle 30. To close the clamping system 40, it is necessary to push on the clamp lever 43 according to arrow A1. When this is done, the force makes clamp lever 43 rotate around pivot 44. This rotation of the clamp lever 43 pushes the main clamp member 41 according to arrow A2. As clamp lever 43, with its leveraging configuration, is continuously pushed, the main clamp member 41 and the secondary clamp member 42 are forced against or toward the male block 32 until closed as shown in FIG. 5D. To open the clamping system 40 and release the robot arm 10 from the docking cradle 30, the clamp lever 43 is pulled according to arrow A3 and the clamping system will move to its opened condition as shown in FIG. 5A. The clamping system 40 is shown as having three member, but could have more of such members. In an embodiment, the clamping system 40 may even have a single member, such as a clamp lever 43 with a cam end. The clamp lever 43 would be pivotally connected to the base link 20, or docking cradle 30 in a reverse arrangement.

Figure 6:
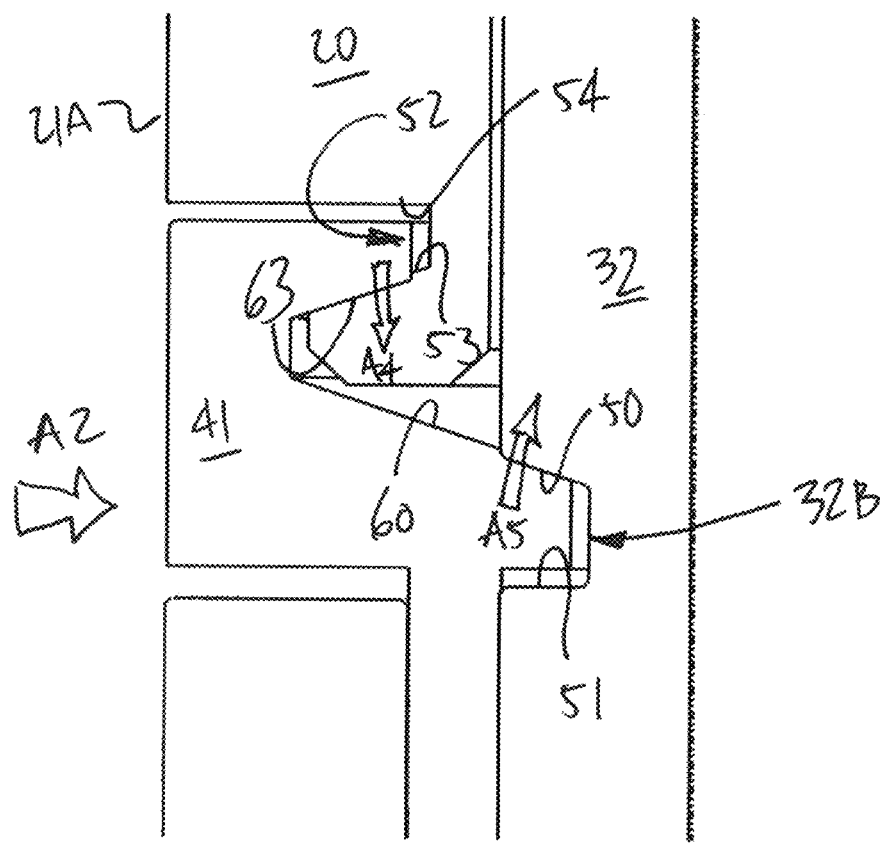
FIG. 6 is a schematic sectioned view of the clamping system in accordance with an embodiment.

It is desired to have the assembly of the base link 20 and docking cradle 30 in a precise position and orientation relative to one another. For example, if the connection interfaces 25A and 32A have surface electrodes as an alternative to pin-socket pairs, it may be desired to adjust the vertical position of the base link 20 relative to the docking cradle 30. Therefore, the clamping sequence shown in FIGS. 5A-5D may be used to cause an interaction between the base link 20 and the docking cradle 30 that will lead to a desired vertical position. FIG. 6 illustrate in more details how the clamping system 40 works to precisely position the robot arm 10 on the docking cradle 30 for the contact of both interfaces 25A and 32A to be as desired. The recessed groove 32B in the male block 32 may have an upper surface 50 angled in comparison to its generally horizontal bottom surface 51. Similarly, the tubular body 21 of the base link 20 may continue downwardly beyond the surface 25 (FIG. 3) to define part of the cavity 27, and cooperate with the clamping system 40 by forming a groove 52 (FIG. 6). Hence, the groove 52 is located in the base link 20 and is shaped in such a way that its bottom surface 53 is angled compared to its upper surface 54, the latter being generally horizontal. In order to cooperate with angled surfaces 50 and 53, the main clamp member 41 is designed with a hook-shaped cross-sectional geometry that includes angled surfaces 60 and 63, respectively cooperating with angled surfaces 50 and 53, in a wedging action. When the main clamp member 41 is moved towards the male block 32 by pushing on the clamp lever 43, there results the movement A2 (same as in FIGS. 5A to 5D), with the angled surface 63 of the main clamp member 41 causing a downward force on angled bottom surface 53, as shown by A4. The combined action of the clamping movement expressed by A2 and the angled surfaces 53 and 63 leads to the downward force A4. Concurrently, the action of the clamping movement shown by direction A2, between the angled surfaces 50 and 60 leads to an upward force represented by A5. The combined forces shown by A4 and A5 causes the base link 20 to automatically position itself vertically relative to the docking cradle 30 when the clamping system 40 is in its closed position.

Figure 7:
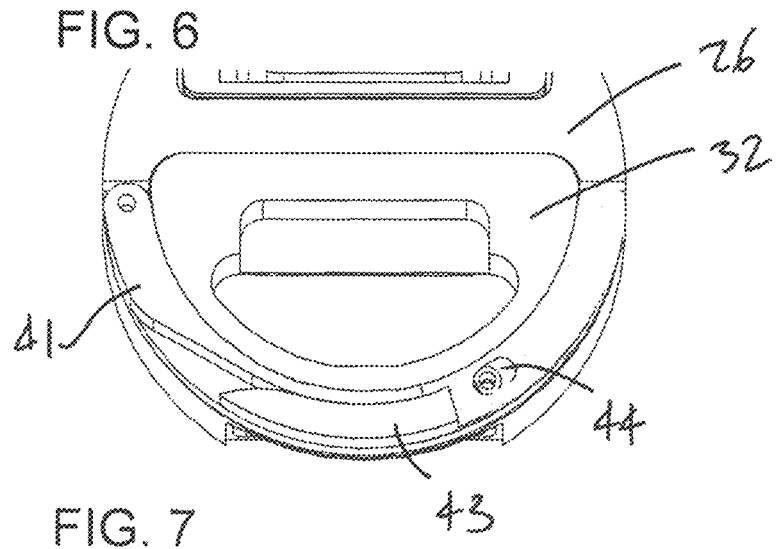
FIG. 7 is an underside sectional view of an adjustment feature for a pivot of the clamping system of FIG. 6.
Figure 8A:
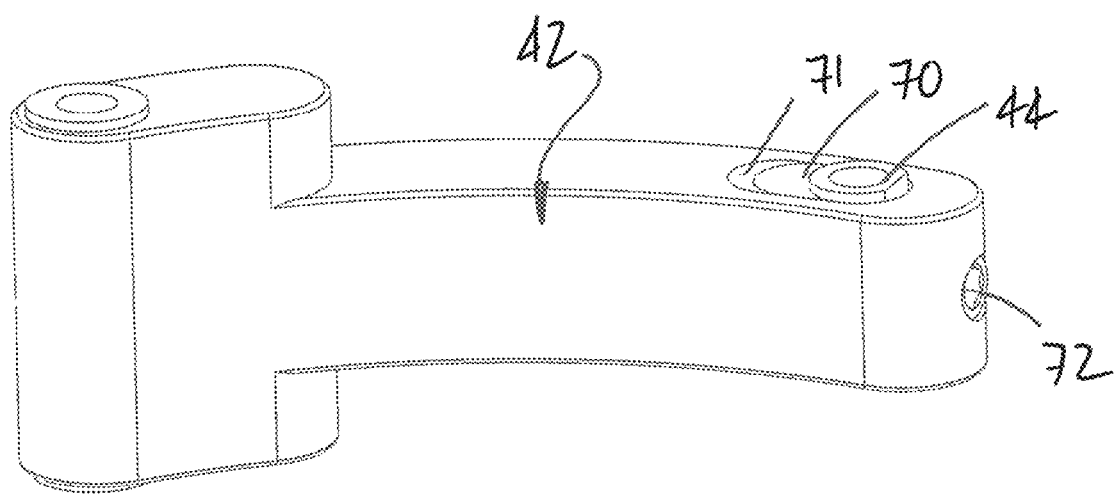
FIG. 8A is an isometric view of a clamp lever with the adjustment feature of FIG. 7.
Figure 8B:
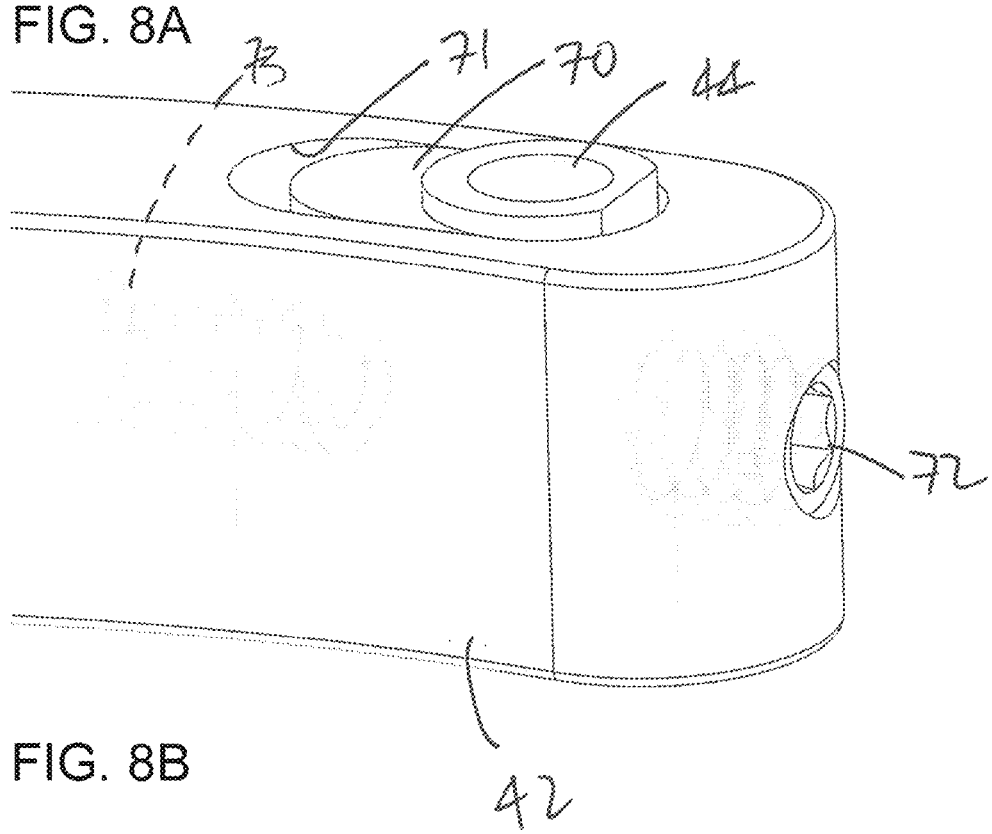
FIG. 8B is an enlarged isometric view of the clamp lever with the adjustment feature of FIG. 7.

Referring to FIGS. 7, 8A and 8B, an adjustment of the position of the clamp 44 may be possible, and may be added in the clamping system 40 to ensure precise fit of the clamp lever 43 relative to the main clamp member 41 to ensure that the clamping force described in FIG. 6 is as desired. For example, the adjustment of the position of the pivot 44 may be such that an outer surface of main clamp member 41 is even with the outer peripheral surface 21A of the base link 20 when the clamping system 40 is in its closed position, for a generally continuous surface to result.

As best seen in FIGS. 8A and 8B, instead of having a pivot pin for pivot 44 in clamp lever 43, the pivot 44 may be inserted in a pivot holder 70 in the secondary clamp member 42. The pivot holder 70 sits in elongated slot 71 and the pivot holder 70 may have its position modified by using set screw 72, or like position adjustment system. Biasing member 73, such as spring, biasing pad, etc, biases the pivot holder 70 towards the set screw 72. Turning the set screw 72 in a first direction, e.g., clockwise, moves the pivot holder 70 away from a tip of the clamp lever 43, while turning the set screw 72 in the opposite direction moves the pivot holder 70 toward the clamp lever 43 tip. This movement of the pivot holder 70 modifies the position of the pivot 44, thus enabling a fine adjustment of the position of the pivot 44 to adjust the clamping force, and allowing if desired for the exterior surface of the clamp lever 43 to be even with that of the main clamp member 41 and of the outer peripheral surface 21A of the base link 20 when in the closed position of FIG. 5D. The overall possible travel of the pivot holder 70 may for example be around +/−1.5 mm, but this can be greater if required. The adjustment of the position of pivot 44 may be optional. This may be regarded as a lockable translational joint, in that the position of the pivot 44 may be adjusted and locked in place relative to the clamp member 42.

Figure 9:
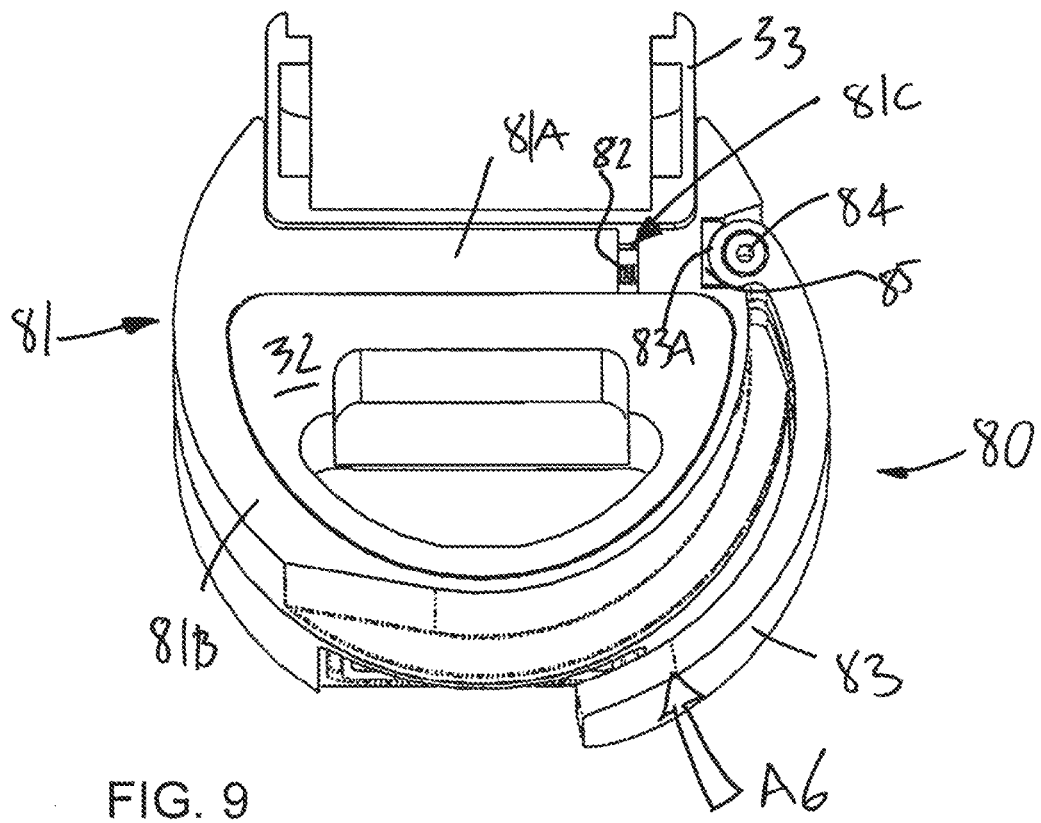
FIG. 9 is an underside sectional view showing another embodiment of the clamping system of the present disclosure.
Figure 10:
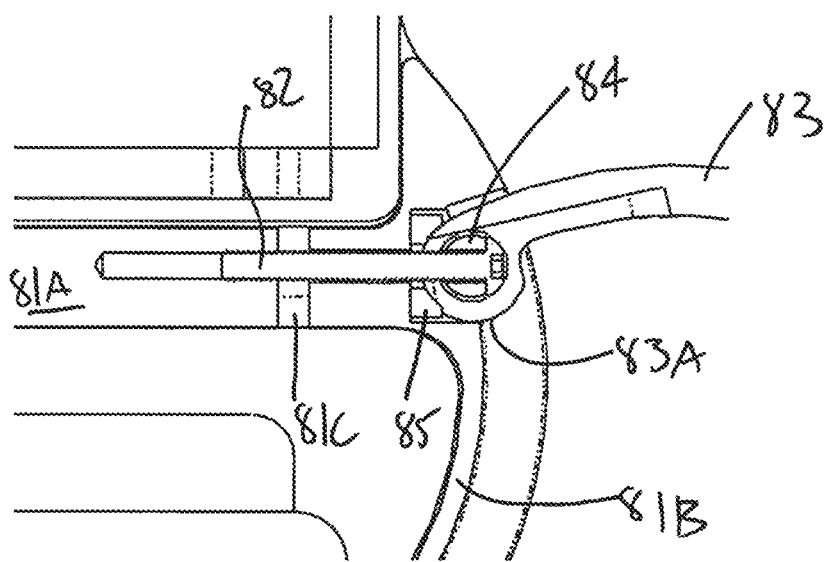
FIG. 10 is a sectional view of the clamping system of FIG. 9.
Figure 11:
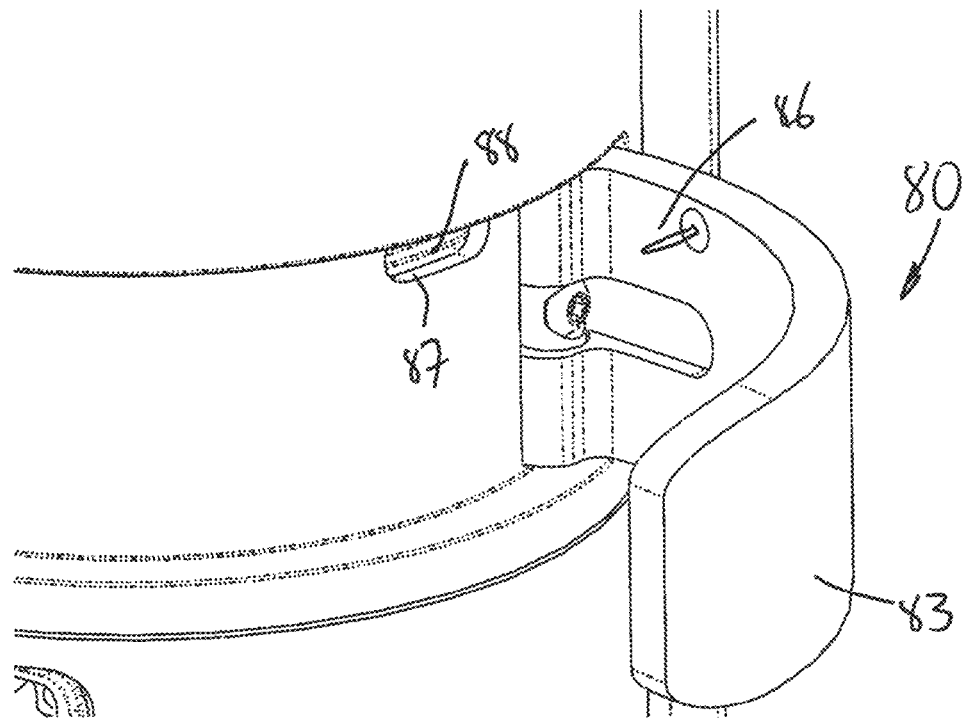
FIG. 11 is an enlarged isometric view of the clamping system of FIG. 9, with positioning pin.

Referring to FIGS. 9-11, another configuration of the clamping system is shown at 80. In the clamping system 80, a clamp member 81 is a continuation of the cavity 27 in the base link 20. The clamp member 81 has a straight section 81A and a curved section 81B, both concurrently circumscribing an opening of the cavity 27. The straight section 81A and the curved section 81B are separated by a gap 81C, with a fastener such as a bolt 82 threadingly engaged to threading inside the straight section 81A (FIG. 10), with the receiving bore in the straight section 81A being threaded. Clamp lever 83 (a.k.a., clamp locking handle) has a cam-shaped end 83A and is pivotally movable around pivot 84. According to an embodiment, a pad 85 may be sandwiched between a surface of the curved section 81B and the cam-shaped end 83A, the pad 85 having a concave surface for the cam-shaped end 83A and a flat surface for contacting the curved section 81B.

To close the clamping system 80 when robot arm 10 is installed on docking cradle 30—i.e., with the male block 32 inside the cavity 27 as in FIGS. 9-11—a push movement in the direction of arrow A6 is done on clamp lever 83. This movement, combined with the geometry of the cam-shaped end 83A, generates a force that reduces the gap 81C by elastic deformation of the curved section 81B. This results in a tightening of the clamp member 81 around the male block 32. In doing so, the clamping system 80 may cause the complementary actions shown in FIG. 6 of the angled surfaces described in FIG. 6 are present in the embodiment of the clamping system 80.

When the clamp member 81 is in the fully closed position, the robot arm 10 is frictionally engaged on the male block 32. To release the robot arm 10 from the docking cradle 30, the clamp lever 83 is pulled in the direction opposite arrow A6. This movement, combined with the geometry of the cam-shaped end 83A, results in the increase of the dimension of the gap 81C, by the curved section 81B urged to return to its initial position after elastic deformation, thus releasing the clamp member 81 from frictional engagement around the male block 32. Once the clamp member 81 is in an open position, the base link 20 can be pulled out from the docking cradle 30.

The tightening force of the clamping system 80 may need to be adjusted. This tightening force is obtained by using the bolt 82, also known as an adjustment screw. The bolt 82 may be rotated in a first direction using the clamp lever 83 to reduce the gap 81C, and cause an eventual increase in the tightening force when the clamp member 81 is closed. Similarly, rotating the bolt 82 in the opposite direction may be done to reduce the tightening force. This adjustment may be performed to ensure that the clamping system 80 produces a desired tightening force.

The tightening of the clamp member 81 around the male block 32 may cause the complementary actions shown in FIG. 6 of the angled surfaces described in FIG. 6 are present in the embodiment of the clamping system 80. It is also considered to provide a positioning pin 86 located on an inside surface of the clamp lever 83. When the clamp member 81 is in its fully closed position, positioning pin 86 may go through a pin window 87 (or receptacle) is inserted in a cradle groove 88, as shown in FIG. 11. The cooperation between the pin 86 and the cradle groove 88 may result in a proper vertical positioning of the base link 20 relative to the docking cradle 30 via this additional feature of the clamping system 80.

Figure 12:
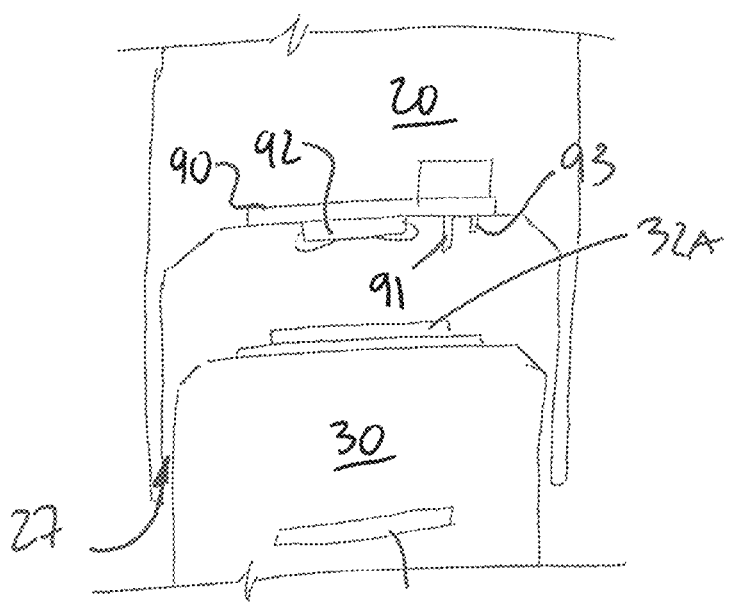
FIG. 12 is a schematic illustration of connection interfaces for the robot arm of FIG. 1.

FIG. 12 presents a not-to-scale schematic view of both connection interfaces 25A and 32A, respectively found on the surface 25 of the base link 20 and on the male block 32 of the docking cradle 30. As mentioned above, connection interface 32A may be free of pins or sockets and is generally a continuous surface, even with its surrounding surface. Connection interface 25A may be composed of a plurality of main components (three shown), all directly connected to a PCB 90 (supporting typical chips and circuitry, including an Eeprom). Each of these components has a specific function and contact connection interface 32A in a specific sequence. When the clamping process is performed, the ground pin 91 is the first to contact its dedicated area of connection interface 32A. This will put the electrical components of both interfaces 25A and 32A to the same voltage reference. Then, the multiple contacts 92 come into contact with the interface 32A. It is through the multiple contacts 92 that all signals, communication and power will eventually go from the docking cradle 30 to all various electrical and electronic components of robot arm 10, via the base link 20. Lastly, an enable pin 93 will contact its dedicated area of the connection interface 32A. Both pins 91 and 93 may be spring loaded to avoid any damage on connection interface 32A. The embodiment of FIG. 12 is an example among others, as the robot arm 10 may employ more traditional pin-socket assemblies as well.

Figure 13:
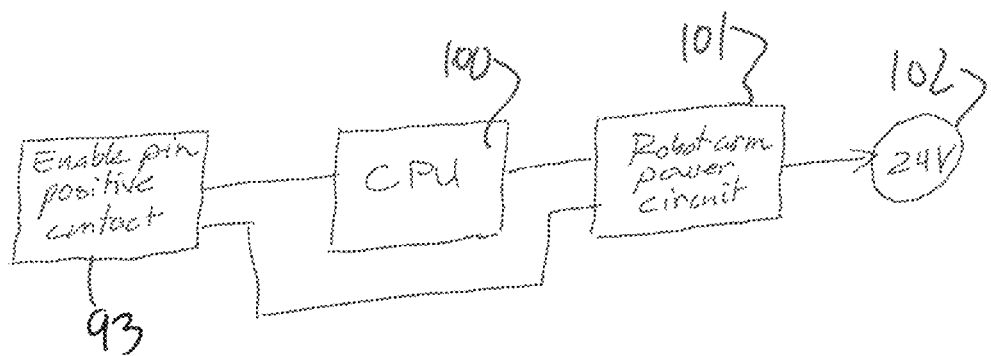
FIG. 13 is a schematic illustration of a circuit logic powering the robot arm of FIG. 1.

Referring to FIG. 13, there is illustrated an embodiment of a circuit logic before the robot arm 10 is powered. Once the enable pin 93 contacts the connection interface 32A, a predetermined voltage is verified and, if it is within range, a processor unit (e.g., CPU) 100 is notified. The processor unit 100 verifies that all the power-up conditions are met and may then trigger a robot arm power circuit 101. In the arrangement of FIG. 13, the power circuit is activated only if the enable pin 93 is within a specific voltage range and this may prevent electrical arcing and damage to the electrical contacts. Once the power circuit is activated, the required voltage, by example 24V, is sent to the robot arm 10, as shown by 102. Following the powering, a software process may be triggered to start: initializing the robot arm 10, giving IP addresses to the various components of the robot arm 10, software version verification of the various components of the robot arm 10 and software updates uploaded if required, etc.

Based on the arrangement of the circuit logic presented in FIG. 13, there is no power on interface 32A when the robot arm 10 is removed from a docking cradle 30. There may consequently be no potential electrical hazard for the users because, in the event of a disconnection of the robot arm 10 from the docking cradle 30 while still powered, the power is cut without the involvement of the processor unit 100 as the enable pin 93 is the first component to lose its contact from the docking cradle's connection interface 32A. This may prevent electrical contacts between both interfaces 25A and 32A.

In an embodiment, the processor unit 100 is located in the docking cradle 30. With this configuration, it is possible to perform support and provide software updates for the processor unit 100 even if no arm 10 is installed on the docking cradle 30. The software updates will then be transferred to the robot arm 10 once clamped. A chip 103 such as one including Eeprom (FIG. 12) is one contemplated embodiment to store calibration data and other pertinent information for the robot arm 10. Alternatively, the robot arm 10 could enclose the processor unit 100. This option could be a cost effective solution in a specific application where the number of docking cradles 30 is greater than the number of robot arms 10.

Figure 14:
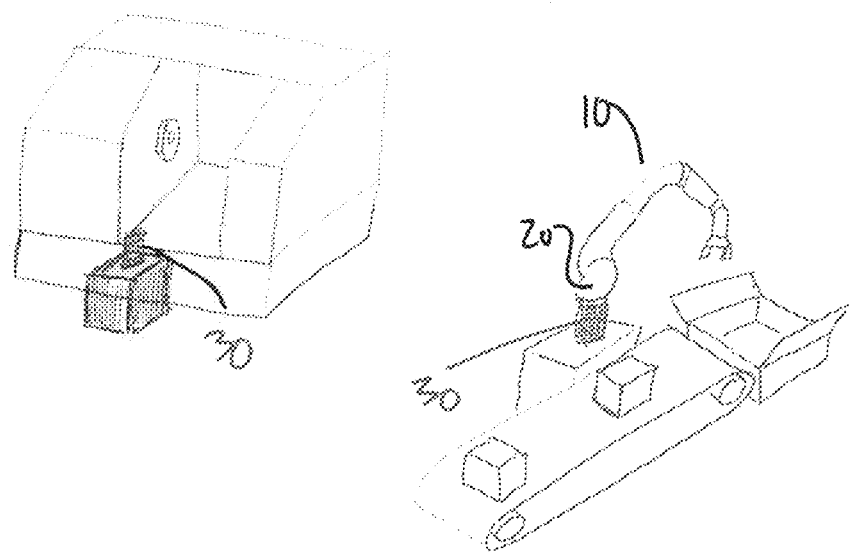
FIG. 14 is a representative view of workstations at a manufacturing facility having multiple docking cradles and one robot arm that can be moved from one workstation to another as needed.
Figure 14:
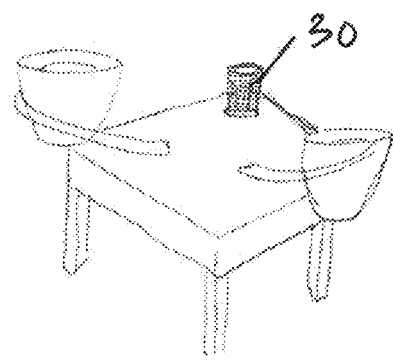

Finally, as outlined earlier, an aspect of the robot arm 10 is that it may provide the ability for a manufacturer to install robot docking cradles 30 at its multiple workstations and transfer the robot arm 10 from one docking cradle 30 to another depending of production requirements. FIG. 14 is a typical schematic view of such a production floor. In this example, the manufacturer has three docking cradles 30 installed at three different workstations and one robot arm 10. Depending of its daily production needs, the manufacturer can use the robot arm at the CNC lathe workstation, the assembly workstation or at the packaging line.

The invention claimed is:

1. A system comprising:
   an articulated robot arm including assembly of links interconnected with motorized joint units at joints between the links for movements of the links relative to one another, one of the links being a base link;
   at least one docking cradle adapted to be connected to a structure and configured for being releasably connected and for supporting the articulated robot arm;
   a coupling configuration between the base link and the docking cradle for powering contact to be made; and
   a clamping system including two clamp members and a clamp lever for locking the base link to the docking cradle at the coupling configuration;
   wherein the clamp members are each pivotally connected to a wall to define a female cavity therewith, the clamp lever pivotally connected to both of the two clamp members to tighten the female cavity.

2. The system according to claim 1, wherein the clamp members are separated by a gap, and the clamp lever includes a cam-shaped end to open and close the gap.

3. The system according to claim 2, further comprising a pin and pin receptacle set between the clamp lever and the docking cradle for vertical alignment of the docking cradle with the base link.

4. The system according to claim 1, wherein the coupling configuration includes a male block on the docking cradle for being coupled into the female cavity.

5. The system according to claim 4, wherein the base link has a vertical wall defining a portion of the cavity.

6. The system according to claim 5, wherein the vertical wall is received between the male block and another male block of the docking cradle.

7. The system according to claim 1, wherein the clamp lever and one of the clamp member are fitted into the other clamp member when tightening the female cavity.

8. The system according to claim 1, wherein the female cavity is in the base link, and the coupling configuration includes a male block on the docking cradle for being coupled into the cavity.

9. The system according to claim 8, further comprising wedge surface sets in the male block and the clamping system for vertical alignment of the docking cradle with the base link.

10. The system according to claim 1, further comprising a lockable translational joint between one of the clamp member and the clamp lever to adjust the tightening.

11. The system according to claim 1, further comprising a plurality of the docking cradle for one of the articulated robot arm, the articulated robot arm being releasably connected between the plurality of the docking cradle.

12. An assembly comprising:
    a docking cradle adapted to be connected to a structure;
    a base link of an articulated robot arm adapted to be releasably mounted to the docking cradle, the base link interconnected to a remainder of the articulated robot arm by a motorized joint unit;
    a male and female coupling configuration between the base link and the docking cradle for powering contact to be made, the docking cradle defining a male coupling received in a female coupling of the base link; and
    a clamping system including at least one clamp member and a clamp lever for locking the base link to the docking cradle at the male and female coupling configuration, the at least one clamp member received in a groove of the male coupling.

13. The assembly according to claim 12, wherein the female coupling includes a cavity defined by the base link and by the clamping system.

14. The assembly according to claim 13, wherein the clamp member has sections forming the cavity and separated by a gap, and the clamp lever includes a cam-shaped end to open and close the gap.

15. The assembly according to claim 12, wherein the clamping system includes two of said clamp member, each pivotally connected to a wall to define a female cavity therewith, the clamp lever pivotally connected to both of the two clamp members to tighten the female cavity.

16. The assembly according to claim 15, wherein the clamp lever and one of the clamp member are fitted into the other clamp member when tightening the female cavity.

17. The assembly according to claim 16, wherein further comprising wedge surface sets in the male coupling and the clamping system for vertical alignment of the docking cradle with the base link.

18. The assembly according to claim 16, further comprising a lockable translational joint between one of the clamp member and the clamp lever to adjust the tightening.

* * * * *